M. BRADLEY.
PORTABLE LUNCH-HEATERS.

No. 195,255. Patented Sept. 18, 1877.

WITNESSES:
A. W. Almqvist
J. H. Scarborough

INVENTOR:
Maria Bradley
BY
ATTORNEYS.

UNITED STATES PATENT OFFICE.

MARIA BRADLEY, OF NEW YORK, (MORRISANIA P. O.,) N. Y.

IMPROVEMENT IN PORTABLE LUNCH-HEATERS.

Specification forming part of Letters Patent No. 195,255, dated September 18, 1877; application filed July 23, 1877.

*To all whom it may concern:*

Figure 1:
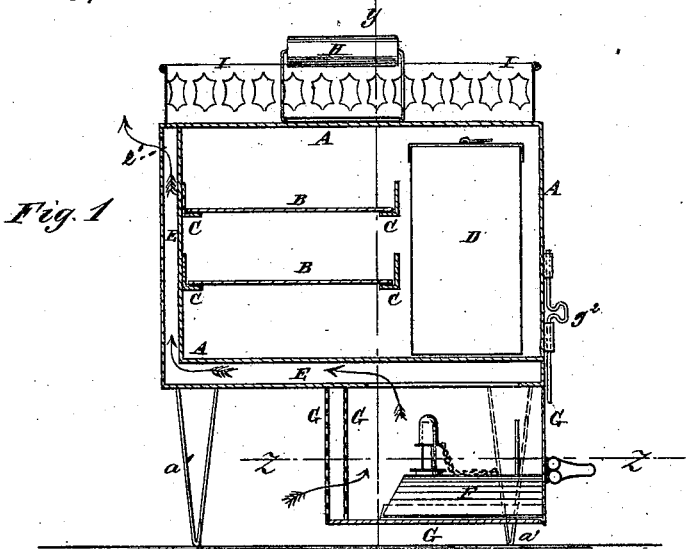
Figure 2:
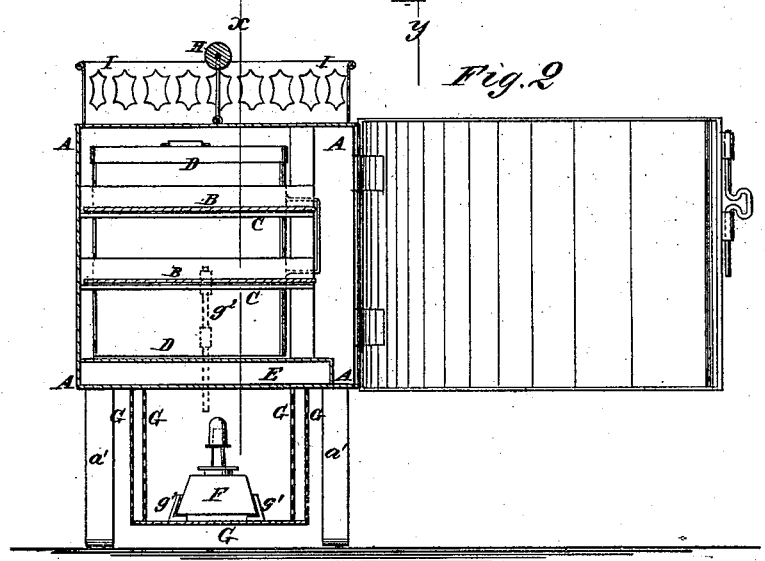
Figure 3:
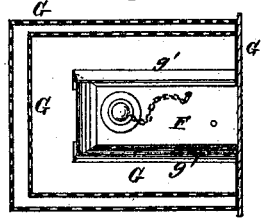

Be it known that I, Mrs. MARIA BRADLEY, of Morrisania P. O., New York city, in the county and State of New York, have invented a new and useful Improvement in Portable Lunch-Heater, of which the following is a specification:

Figure 1 is a vertical section of my improved lunch-heater, taken through the line $x\ x$, Fig. 2. Fig. 2 is a vertical section of the same, taken through the line $y\ y$, Fig. 1, the door being swung back and not sectioned. Fig. 3 is a horizontal section of the lamp-chamber, taken through the line $z\ z$, Fig. 1.

Similar letters of reference indicate corresponding parts.

The object of this invention is to improve the construction of the lunch-heater for which Letters Patent No. 168,133 were granted to me September 28, 1875, so as to make it more convenient and effective in use for keeping a lunch or dinner warm while being carried from the place where it is cooked to the place where it is to be eaten, and for warming a lunch or dinner quickly, should it become cold, and which shall be simple in construction and inexpensive in manufacture.

The invention will first be described in connection with the drawings, and then pointed out in the claim.

A is a box, of any desired or convenient size, and which I prefer to make rectangular in shape, and which is provided with legs $a'$, of convenient length. B are shelves, the ends of which rest upon cleats or angle-strips C, attached to the box A. A narrow space is left at one end of the shelves B to receive a cup, D, to contain coffee, tea, soup, or other liquid.

The bottom and one end of the box A are made with double walls, to form a space, flue, or hot-air chamber, E, for the heated air from the lamp F to pass through, to more quickly, thoroughly, and economically heat the box A and its contents. The lamp F is placed in a chamber, G, attached to the bottom of the box A at one end. The chamber G is made with double walls, of perforated sheet metal, upon its sides and inner end, so as to prevent the wind from blowing out the lamp, while allowing air to pass in freely to said lamp.

The outer end of the chamber G is detachable, and to it is attached the lamp F, so that the said lamp may be inserted and withdrawn by means of the said end. The lamp F is further secured in place by flanged cleats or angle-strips $g^1$, attached to the bottom of the chamber G, and which form a dovetailed groove, into which the lamp F is slid. The detachable end of the chamber G is secured in place by a bolt, $g^2$, sliding in keepers, attached to the end of the box A, or by other convenient fastenings. The lower bottom of the box A is cut away over the chamber G to allow the air heated by the lamp F to pass freely into the space E, from which it escapes through holes $e'$ in the upper part of the outer end walls of the box A.

To the top of the box A is attached a handle, H, for convenience in carrying it. To the edge of the top of the box A is attached a rim or flange, I, to form a tray to receive and carry knives, forks, spoons, napkins, and other articles.

The rim or flange I may be made plain, or may be ornamented as may be desired.

Having thus described my invention, what I claim as new, and desire to secure by Letters Patent, is—

The internally-shelved box A, cut away at the bottom, having holes $e'$, and double walled at bottom and one end, in combination with a subjacent chamber, G, having the slide-lamp F, as shown and described, to form a lunch-heater.

MRS. MARIA BRADLEY.

Witnesses:
JAMES T. GRAHAM,
JAMES H. HUNTER.